H. A. COURMETTES AND A. B. COX.
RANGE FINDER.
APPLICATION FILED JULY 13, 1917.
1,381,453. Patented June 14, 1921.
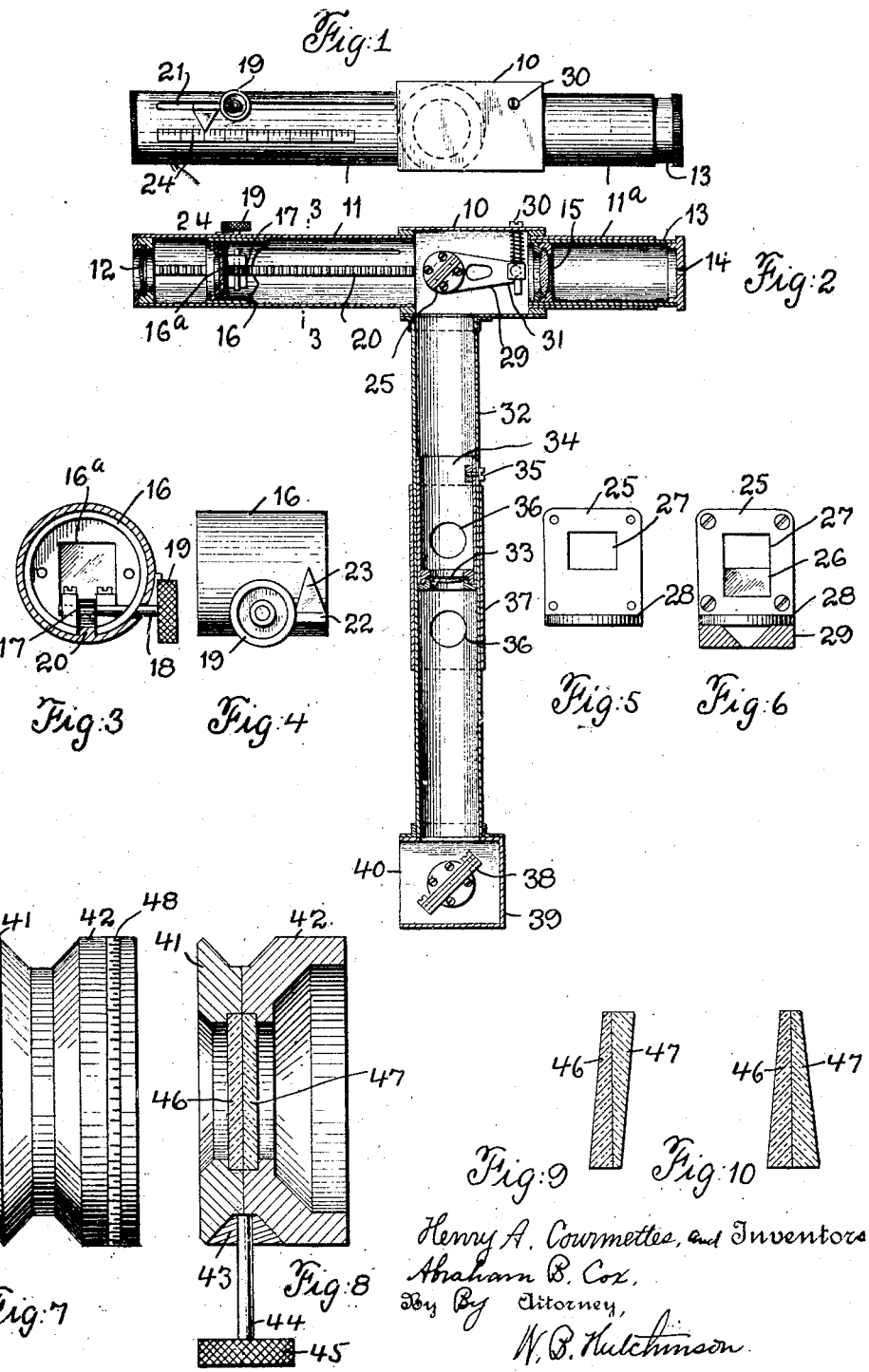

UNITED STATES PATENT OFFICE.

HENRY A. COURMETTES, OF NEW YORK, AND ABRAHAM B. COX, OF CHERRY VALLEY, NEW YORK.

RANGE-FINDER.

1,381,453.  Specification of Letters Patent.  Patented June 14, 1921.

Application filed July 13, 1917. Serial No. 180,332.

*To all whom it may concern:*

Be it known that we, HENRY A. COURMETTES, a citizen of France, and a resident of the city of New York, county of Kings, and State of New York, and ABRAHAM B. Cox, a citizen of the United States, and a resident of Cherry Valley, Otsego county, New York, have invented a new and useful Improvement in Range-Finders, of which the following is a full, clear, and exact description.

Our invention relates to improvements in range finders and especially to that type of range finder which depends upon the coincidence or matching of the halves of two distinct images of a distant object. The object of our invention is to produce a simple, accurate and reliable mechanism which can be conveniently used and quickly adjusted. Moreover the invention is intended to produce a structure of the kind which is not likely to get out of order easily, and in which the adjustment is very quick and accurate and the measurements also accurate.

Reference is to be had to the accompanying drawings forming a part of this specification, in which similar reference characters indicate corresponding parts in all the views.

Figure 1 is a front elevation of the apparatus.

Fig. 2 is a sectional plan thereof.

Fig. 3 is a cross section on the line 3—3 of Fig. 2.

Fig. 4 is a detail side elevation of a part of the structure shown in Fig. 3.

Fig. 5 is a back view of the half mirror forming a part of the structure.

Fig. 6 is a front view of the same.

Figs. 7 and 8 show a modification of the adjusting prism, and

Figs. 9 and 10 show the prisms in different positions.

The apparatus is provided with a box 10 from which extends a tube or telescope 11 and also the tube 11ª, these parts 10, 11 and 11ª really forming a telescope, and all being in alinement as shown in Fig. 2. The tube 11 is provided with an objective lens 12, and the tube 11ª has an eye piece 13 with an aperture 14 therein. The eye piece also carries a lens 15. Within the tube 11 is a slider or runner 16 in the form of a short tube which carries a prism 16ª and which is movable back and forth in the tube 11, being adjusted so that the image will be properly projected on the half mirror 25 as hereinafter described. The runner 16 is provided with a pinion 17 secured to the shaft 18, this being suitably mounted as shown and extending outward through a slot 21 in the tube 11, having at its outer end a thumb wheel 19 by which it can be turned. The pinion meshes with a fixed rack 20 on the tube 11, and so by turning the pinion it will run on the rack and move the runner 16 backward and forward as desired. The tube 16 also carries an arm or bracket 22 which also moves in the slot 21, and has a pointer 23 moving over the scale 24 which is graduated to indicate the distance of the object from the observer.

In the box 10 is a half mirror 25, the lower part being opaque as shown at 26 and the upper part clear as shown at 27 in Figs. 5 and 6, the mirror being substantially like that of a mariner's sextant, and for convenience it has a base 28 secured to the bracket 29 and this is pivoted in the box 10 and can be adjusted by the screw 30 so as to bring the mirror 25 into proper relation with the mirror 38. This mirror will be referred to below.

Extending from the box 10 at right angles to the tube 11 is a tube 32 which contains the lens 33, which is at the same distance from the half mirror 25 as is the objective lens 12, and the two lenses 12 and 33 are in all respects similar. The lens 33 is for convenience mounted in the tube 34 which can be adjusted slightly in the tube 32 and is held by the screw 35 so as to fix the position of the lens 33 and make it the same distance from the half mirror 25 as the lens 12. For convenience in cleaning, etc., the tubes 32 and 34 are provided with openings 36 adjacent to the lens 33, and these openings are covered by a sleeve 37. At the outer end of the tube 32 is a mirror 38 which is opaque and is parallel with the mirror 25. This is confined in the housing 39 which is open on one end as shown at 40, and this may be protected by glass or the like if desired.

In using the apparatus as described, the eye is applied to the aperture 14, and the tube 11—11ª pointed to the object. The eye piece 13 is then adjusted so that a clear and distinct magnified image of the distant object becomes visible at the half mirror. As the lower half of the mirror is opaque and reflecting, and the upper half clear and transparent, obviously the upper portion of the image of the distant object will be seen through the eye piece. This image will appear inverted, but if desired an erecting eye piece can be used so that the distant object may appear right side up, though the simplicity of the combination of lenses shown is very advantageous as regards illumination, and enables the instrument to be used when the light is poor, as in the early morning or evening.

The rays of light coming from a distant object also strike the mirror 38 and are reflected to the lens 33 which forms a second image of the distant object approximately at the half mirror 25, just as the objective lens 12 forms a first image of the distant object at or on the half mirror 25, only the lower portion of this second image will be reflected to the eye piece 13. It is clear then that the two images will be of the same size and equally magnified by the eye-piece, and as the half mirror is approximately, if not exactly in the focus of the eye piece also with both the images, the upper half of one image and the lower half of the other will be seen clearly and sharply halved by the half mirror, and can be made to coincide or match by adjusting the prism 16ª. When they thus coincide, the range or distance of the distant object can then be read directly from the scale 24 on the tube 11.

If desired the instrument may be modified by placing the sliding prism 16ª between the lens 33 and the half mirror, or a prism of sufficient height to deflect the rays forming only one of the images may be placed between the eye piece and the half mirror. Prisms may of course be used instead of mirrors.

The instrument as illustrated is intended for use for infantry rifle firing or for map making, and is held in the hands, but obviously larger sizes can be mounted on suitable supports if desired.

In Figs. 7 to 10 we have shown a modification of the prism 16ª and its sliding arrangement. As here illustrated two exactly similar miter gears 41 and 42 are held in close proximity to each other by any suitable means and provided with a miter pinion 43 which is secured to a shaft 44, and the latter is provided with a milled wheel 45. If the thumb wheel be rotated, the gears will be displaced in opposite directions at exactly equal angles from the starting pinion. The gears have rectangular apertures centrally located which contain the prisms 46 and 47. These prisms are in all respects exactly alike. Consider them in the position shown in Fig. 9. It will be clear that any ray of light passing through them while in this position will issue from them without angular deflection. If they be equally rotated in opposite directions until they assume the position shown in Fig. 10, the rays of light then passing through them will then be deflected an amount equal to the sum of the deflections produced by the two prisms. By turning the prisms at various angles to each other, the amount of deflection of the rays passing through them can be made to correspond to the distance of the object under observation, by utilizing what is practically a single prism of variable angularity, and a scale 48 is shown on one gear graduated to correspond to the amount of deflection, and the distance or range of the object.

From the foregoing description it will be seen that we have produced a very simple and dependable instrument by which ranges can be accurately and quickly indicated.

It will also be noted that by the arrangement of our simple objective lenses, and of the lens 15, we get achromatic combinations which prevent any aberrations due to prismatic colors or otherwise in the instrument, and that for this reason we get far better illumination than is usual in such instruments. This is in accordance with the well-known principle of optics. The parallel rays of light passing through the objective lenses 12 and 33, focus substantially at the point of the half mirror 25, but as the blue rays are more strongly refractive than the red rays, the red rays will come to a focus slightly in advance of the blue rays, and if the eye of the observer were at this point, he would see the usual image with the well known chromatic aberration effect. The rays having come to a focus near the half mirror, it is clear that after passing this point they cross each other so that the blue rays are on the outside and the red rays inside of the pencil of light. The lens 15 is more powerful than the lenses 12 and 33, and is so placed that the rays will strike it in such fashion that they will be all refracted so as to converge in the eye of the observer, and when the eye is at the proper position, they will all converge at a single focus, thus completely obviating the chromatic aberration. The eye is kept at the proper distance by the peep-hole. The image therefore will be viewed inverted, and it is clear that any degree of magnification can be secured by proper proportioning of the lenses and distances. It is believed that this principle, while well known in optics, is broadly new in its application to range finders. It has the advantage of cheapening the construction and securing very good illumination without any sacrifice of any properties, to say nothing of greatly increased simplicity.

We claim:—

1. A range finder comprising a mirror, two similar objective lenses at equal focal distances from said mirror, said mirror being half transparent and half reflecting and arranged to reflect part of the image produced by one objective lens, and to occlude the same part of the image produced by the other objective lens, means for deflecting the position of the image produced by one of the lenses so that the visible portions of the two images may be brought into alinement, and means for magnifying the visible portions of the said images.

2. A range finder comprising a mirror half clear and half opaque, two objective lenses at equal focal distances from said mirror, means for deflecting the portion of the image produced by one of the lenses so that the visible portions of the two images may be brought into alinement, a second mirror arranged to reflect an image through one of the objective lenses upon the aforesaid half mirror, and a simple lens for magnifying the visible portions of the said images.

3. A range finder comprising a mirror half clear and half opaque, an objective lens and an eye piece on opposite sides and in alinement with said half mirror, a second objective lens arranged at an angle to the half mirror and the same focal distance therefrom as the first objective lens, a reflecting mirror arranged to project an image through the second objective lens, and a simple lens arranged between the half mirror and the eye piece and adapted in combination with the aforesaid objective lenses to form an achromatic combination.

HENRY A. COURMETTES.
ABRAHAM B. COX.

Witnesses:
WARREN B. HUTCHINSON,
M. G. O'DONNELL.